US008587415B1

(12) United States Patent
Followell

(10) Patent No.: US 8,587,415 B1
(45) Date of Patent: Nov. 19, 2013

(54) RECEIVING AN IR CONTROL SIGNAL THROUGH A FRESNEL LENS OF A MOTION SENSOR

(75) Inventor: Christopher W. Followell, Alicante (ES)

(73) Assignee: IXYS CH GmbH (CH)

( * ) Notice: Subject to any disclaimer, the term of this patent is extended or adjusted under 35 U.S.C. 154(b) by 1075 days.

(21) Appl. No.: 12/383,167

(22) Filed: Mar. 20, 2009

(51) Int. Cl.
*G05B 11/01* (2006.01)

(52) U.S. Cl.
USPC .................. 340/12.22; 340/12.15; 340/12.18; 340/10.5; 340/4.31; 315/154; 315/158; 315/193; 250/338.1; 250/340

(58) Field of Classification Search
USPC ................. 340/10.5, 567, 4.31, 12.15, 12.18, 340/12.22, 3.1, 4.1, 4.41, 5.1, 5.51, 10.1, 340/815.46; 250/338.1, 340, 353, 154, 158, 250/193, 380, 382.1, 383; 341/168–174; 398/106, 107; 348/778, 114, 207, 348/208.1, 211.99, 779, 781
See application file for complete search history.

(56) References Cited

U.S. PATENT DOCUMENTS 4,769,545 A * 9/1988 Fraden .......................... 250/353
4,941,036 A * 7/1990 Itoh ............................... 348/778
5,015,994 A * 5/1991 Hoberman et al. ........... 340/567
5,282,028 A * 1/1994 Johnson et al. ............... 725/139
5,546,211 A 8/1996 Devon ........................... 359/154
5,886,821 A * 3/1999 Sohn ............................. 359/619
6,107,938 A * 8/2000 Du et al. .................... 340/12.22
7,286,076 B1 * 10/2007 Provis et al. .................. 341/173
2003/0197625 A1 * 10/2003 Szuba ...................... 340/825.69
2004/0207535 A1 * 10/2004 Stevenson et al. ....... 340/825.22
2006/0210278 A1 * 9/2006 Cregg et al. .................... 398/107
2007/0286600 A1 * 12/2007 Guo et al. ........................ 398/43
2008/0011939 A1 * 1/2008 Yee et al. ................ 250/214 AL
2009/0121842 A1 * 5/2009 Elberbaum .................. 340/10.5
2009/0220243 A1 * 9/2009 Petricoin et al. .............. 398/106

* cited by examiner

*Primary Examiner* — Steven Lim
*Assistant Examiner* — Sisay Yacob
(74) *Attorney, Agent, or Firm* — Imperium Patent Works; T. Lester Wallace; Darien K. Wallace

(57) ABSTRACT

A wall switch motion sensor detects motion using a lens and an infrared detector, and in response performs a function (for example, turns on a light). The motion sensor is also adapted to respond to IR remote control signals of the type customarily used to control electronic consumer devices in the home. In one example, a user uses an ordinary remote control device to transmit a sequence of IR control signals and dead times toward the motion sensor. The detector in the motion sensor detects each IR control signal as an increased amount of IR energy, whereas it detects a dead time as a period of less IR energy. If the periodicity of the sequence is appropriate, then the wall switch motion sensor determines that the sequence is an instruction. In one example, the instruction is to turn on/off the light controlled by the wall switch motion sensor.

23 Claims, 8 Drawing Sheets

WALL SWITCH MOTION SENSOR CIRCUIT

DETAIL OF LENS, SENSOR, MICROCONTROLLER

RECEIVING AN IR CONTROL SIGNAL THROUGH A FRESNEL LENS OF A MOTION SENSOR

TECHNICAL FIELD

The described embodiments relate to electronic motion sensors, and more particularly to a motion sensor that can be controlled by an infrared remote control device to control lighting.

BACKGROUND INFORMATION

FIG. 1 (Prior Art) is a simplified perspective view diagram of a typical wall switch motion sensor 1 contained within an electrical wall box 2. Wall box 2 is in turn embedded in a wall 3 of a building. The electronics of the wall switch motion sensor 1 include a switch that can be closed such that AC current is made to flow from AC Live line 4, through light 6 (for example, an incandescent light bulb), and to AC Neutral line 5, thereby causing light 6 to emit light. The electronics of the wall switch motion sensor 1 can also open the switch such that no current flows through light 6, thereby turning off the light.

Wall switch motion sensor 1 includes a multi-section lens 8 (for example, a multi-section Fresnel lens). The motion sensing circuit detects movement of an infrared-emitting object (for example, a person) that moves in front of the lens. In response to this detecting, the motion sensing circuit either turns on light 6 or leaves light 6 turned on. If the motion sensing circuit detects no movement of an infrared-emitting object in front of the lens 8 for an amount of time, then wall switch motion sensor 1 may, in one case, cause the switch to decouple AC Live line 4 from AC Neutral line 5, thereby turning light 6 off. The wall switch motion sensor 1 thus conserves electrical energy by reducing energy usage when no person is detected to be occupying the room. Conversely, if a person is occupying the room and moves in front of lens 8, then wall switch motion sensor 1 closes the switch, thereby turning light 6 on, or keeping light 6 on. A user may also manually turn light 6 on or off using a manual power switch 7.

FIG. 2 (Prior Art) is an exploded view of the wall switch motion sensor 1 of FIG. 1, showing how the wall switch motion sensor is disposed within the electrical wall box 2 in the wall 3. Wall switch motion sensor 1 is customarily attached to electrical wall box 2 using a pair of screws 9 and 10. A face-plate 11 is customarily situated to cover the edges of the wall switch motion sensor 1 as illustrated. The face-plate is also customarily attached via screws 12 and 13.

FIG. 3 (Prior Art) is a simplified top-down cross-sectional view of multi-section lens 8 (a Fresnel lens) within the wall switch motion sensor 1 of FIGS. 1 and 2. The view shows how lens 8 works to allow a wall switch motion sensor 1 to detect motion. Lens 8 includes several sections. Each section directs infrared radiation from a corresponding respective one of several zones onto a pyroelectric infrared detector 12. Detector 12 is sometimes referred to as a PIR detector or a PIR sensor. The term PIR detector will be used here.

When there is a source of infrared radiation in a zone of the field of view of a section of the lens, infrared radiation received from the zone is directed by the section onto detector 12. When a person emitting infrared radiation passes across the field of view of lens (moving downward in the illustration of FIG. 3), infrared radiation emitted in a first zone 13 is first directed by a first section of lens 8 onto detector 12. Then, as the person moves further and enters an area 14 which is between zones, the intensity of infrared radiation as detected by detector 12 decreases because the source of infrared radiation is no longer in the first zone 13. There is no section of lens 8 that directs onto detector 12 the infrared radiation emitted in the area 14 between zones. As the person moves farther across the field of view (farther down in the illustration of FIG. 3), the source of infrared radiation enters the second zone 15 in view of lens 8. The section of lens 8 associated with this second zone 15 therefore directs more infrared radiation onto detector 12. The resulting increasing and decreasing of infrared energy that is incident on detector 12 is interpreted as a person moving from zone to zone in the field of view of the motion sensor.

FIG. 4 (Prior Art) is another diagram that illustrates movement of a person 16 across the field of view 17 of lens 8. As person 16 moves from the left to the right and into a first zone 18, a section of lens 8 focuses the incident infrared radiation onto detector 12, thereby causing detector 12 to detect an increase in infrared radiation intensity. As person 16 continues moving to the right, person 16 exits the first zone 18 and enters an area 19 between zones. Lens 8, however, directs less infrared radiation emitted from this area 19 onto detector 12. Detector 12 therefore detects a decrease in infrared intensity. Finally, person 16 moves into a second zone 20. A section of lens 8 focuses infrared radiation from zone 20 onto detector 12. The electronics of the wall switch motion sensor 1 interprets the increase and decrease and increase in a signal output by detector 12 as being due to a person moving in the field of view of the wall switch motion sensor.

In a particular wall switch motion sensor, the actual operation of the optics and the PIR detector may be somewhat different than in the simplified, single-element detector described above. The description above is set forth for background information purposes. As is known in the art, there are dual-element detectors and quad-element detectors that operate in slightly different ways. In each case, however, a mechanism for selectively directing infrared radiation from zones in the field of view onto a PIR detector.

In addition to wall switch motion sensors, there are other wall box circuits for controlling lights such as remote controlled wall switch dimmer systems. FIG. 5 (Prior Art) is a simplified diagram of one such system. The system involves a wall switch dimmer circuit 21 situated within a wall box 22, and an infrared remote control 23. The infrared remote control 23 is of a type typically used to control electronic consumer devices (for example, televisions, DVD players, stereo systems). Remote control 23 communicates infrared (IR) control signals encoded onto a specific carrier signal. These IR control signals are received by a corresponding infrared receiver 24 situated in wall switch dimmer 21. The infrared receiver 24 is a narrowband receiver that is tuned to the frequency of the carrier signal. The receiver in the wall switch dimmer can therefore detect the IR control signals as transmitted from infrared remote control device 23 in the presence of noise such as background incident infrared radiation. Other infrared signals that are not properly encoded onto the carrier are, however, rejected and ignored by the infrared receiver 24.

A user of remote control device 23 can turn light 6 on or off manually by pressing on a paddle switch 25 on the wall switch dimmer 21. Manual dimming and brightening may be performed by pressing on a dimmer rocker switch 26. By pressing up or down on the dimmer rocker switch 26, the user may manually cause the intensity of light to gradually increase or to gradually decrease. Indicator lights 27 indicate the degree to which the light has been dimmed.

The same on/off and dimmer functions can be controlled by pressing appropriate keys/switches on remote control 23.

Paddle switch 28 can be used to turn on and off light 6. Rocker switch 29 can be used to change the brightness of light 6. Wall switch dimmer 21 responds to IR control signals from remote control device 23 by changing the duty cycle on-time of a switch such that the average amount of energy supplied to light 6 via AC Live line 4 and AC Neutral line 5 is controlled, as is known in the art. Unfortunately, the remote controlled wall switch dimmer system of FIG. 5 involves a narrowband infrared receiver that only receives and properly interprets particular IR control signals carried on a particular carrier frequency. If the special remote control 23 is lost, then the user can no longer control the wall switch dimmer 21 remotely. Moreover, using the special remote control device 23 involves yet another remote control device in the typical house, which may clutter the user's environment.

FIG. 6 (Prior Art) is a simplified diagram of a prior art infrared receiver circuit 30 that on first inspection might appear to offer a solution to the problem of having to have a specialized remote control device to control dimmer 21. Infrared receiver circuit 30 is a narrowband receiver that self-tunes to detect IR control signals carried on numerous possible different carrier frequencies. Infrared receiver circuit 30 includes several LC tank circuits, each of which is tuned to the frequency of a particular carrier signal to be received. A digital logic circuit 31 switches between these tank circuits by opening and closing switches 32, 33 and 34 until one of the tank circuits begins to resonate in response to an incoming IR control signal. Unfortunately, providing the infrared receiver circuit 30 and its numerous tank circuits in a cost-sensitive wall switch dimmer would likely be prohibitively expensive. Moreover, if specialized remote control 23 is to be dispensed with, then another remote control that the user has would be made to operate with dimmer 21. Due to the great variety of different types of remote control devices present in the market place, programming the receiver circuit of the circuit of FIG. 6 to detect and respond to control signals from any selected one of these numerous different remote controls in a given user application would be cumbersome. Employing the circuit of FIG. 6 therefore does not provide an economically viable way to dispense with the specialized remote control of FIG. 5 in a light dimming application. It is expensive and cumbersome. An alternative way of controlling lighting is sought.

SUMMARY

A Motion Detector and Lighting Control Circuit (MDLCC) detects motion by receiving infrared radiation through a multi-section lens and onto a PIR detector. In one example, the MDLCC is a wall switch motion detector. In response to detecting motion, the wall switch motion sensor causes a device (for example, a switch) to perform a desired function (for example, to supply current to a light or to prevent current flow to a light). In addition to its motion sensing function, the novel wall switch motion sensor is adapted to respond to sequences of one or more discrete infrared (IR) remote control signals transmitted from a typical IR remote control device. The circuitry of the wall switch motion sensor is not a narrowband receiver but rather detects relatively slow changing infrared levels such as are generated when living bodies move across the field of view of the motion sensor. As such, the circuitry of the wall switch motion sensor does not discern individual bits of keycodes of the IR control signals. However, the circuitry of the wall switch motion sensor does detect an average general increase in infrared energy when such an IR control signal is received.

In one example, a particular sequence of discrete IR control signals is received by the wall switch motion sensor through a multi-section lens and onto an infrared receiver. The wall switch motion sensor is programmed to interpret the particular sequence of IR control signals as an instruction. In response to detecting such an instruction, the wall switch motion sensor causes an associated device (for example, a switch) to perform a corresponding function (for example, to close or to open).

In one operational example, a user performs a series of discrete key presses on a remote control device in order to generate a sequence of such discrete IR control signals. Each IR control signal is the result of an associated key press by the user. In another example, a user presses a single macro function key. In response to this single key press, the remote control device generates the sequence of IR control signals with the predetermined timing. Regardless of how the sequence of IR control signals is generated, the wall switch motion sensor interprets an IR control signal as a discrete burst of infrared energy if it is separated from the next IR control signal in the sequence by an appropriate amount of "dead time" (for example, twenty milliseconds). Each different sequence may be interpreted to be a different instruction. Examples of instructions include turning on a light, turning off a light, dimming a light, brightening a light. In one example, the wall switch motion sensor performs these instructions by controlling a TRIAC switch. The TRIAC switch controls a flow of AC current through a light or other device.

The wall switch motion sensor is thus able to perform both motion sensing and remote controlled dimmer functions without involving a special dedicated remote control. Any remote control device that transmits standard IR control signals to electronic consumer devices can be used to control the wall switch motion sensor. Providing the remote control functionality to the wall switch motion sensor involves very little additional cost because the same lens and PIR detector circuitry used for the motion sensing is usable to receive the sequences of IR control signals. Generally only a small amount of program code need be provided for the microcontroller of an existing wall switch motion sensor design in order to enable the wall switch motion sensor to identify and respond to particular sequences of IR control signals.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 7:
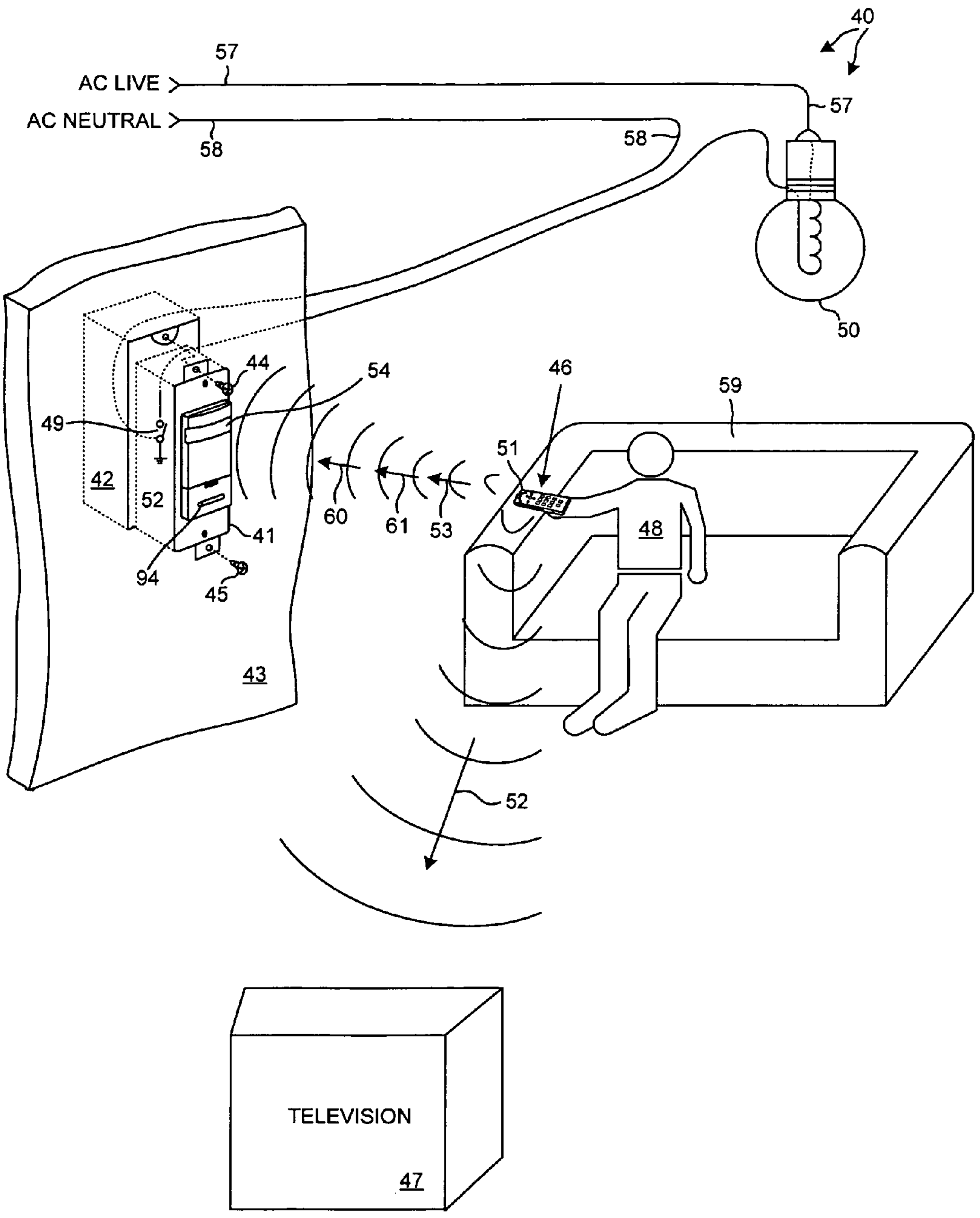
FIG. 7 is a diagram of a wall switch motion sensor in accordance with one novel aspect.

FIG. 7 is a diagram of a system 40 in accordance with one novel aspect. A novel wall switch motion sensor 41 is situated within an electrical wall box 42. Wall switch motion sensor 41 and electrical wall box 42 are disposed in a wall 43 of, for example, a home or office building. For illustrative purposes, the diagram shows the novel wall switch motion sensor 41 in exploded view disposed outside electrical wall box 42. It is to be understood, however, that in use the wall switch motion sensor 41 is secured within electrical wall box 42 by, for example, screws 44 and 45. Not shown is a faceplate which is attached in customary fashion. Wall switch motion sensor 41 includes a first device 49 (for example, a switch) as will be explained in further detail below.

System 40 also involves a remote control device 46, an electronic consumer device 47, and a second device 50. Electronic consumer device 47 may, for example, be a television, a set-top satellite or cable box, a DVD player, or a stereo system. In this example, electronic consumer device 47 is a television as shown. A user 48 can manipulate the remote control device 46 in order to control television 47. Remote control device 46 in this example is a standard infrared (IR) remote control device that the user 48 uses to control television 47. Second device 50, in the illustrated example, is an incandescent light bulb.

In the system 40, the user 48 can press one of the keys 51 on the remote control device 46, thereby causing remote control device 46 to emit a first IR control signal 52. First IR control signal 52 involves a keycode and a system code of an infrared control codeset. The keycode and system code are modulated onto a infrared carrier signal in standard fashion, such that the resulting IR control signal 52 is received and understood by television 49. Depending on the keycode, IR control signal 52 causes television 47 to turn on or off, or to operate the various other functions of the television 47.

In accordance with one novel aspect, user 48 can use the same remote control device 46 to transmit a second IR control signal 53 to the novel wall switch motion sensor 41. Second IR control signal 53 involves a keycode and a system code that are modulated onto the same carrier signal as in the case of the first IR control signal 52. The first and second IR control signals 52 and 53 employ the same codeset modulation protocol.

Wall switch motion sensor 41 receives the second IR control signal 53 through a multi-section lens 54 and, in response to this receiving, causes first device 49 to perform a desired function. In the example of FIG. 7, the first device 49 is a switch and the desired function is to open the switch. Consequently, current is stopped from flowing through AC Live line 57, through the light 50, through the switch 49, and through AC Neutral line 58. By opening switch 49, light 50 is turned off.

Figure 1:
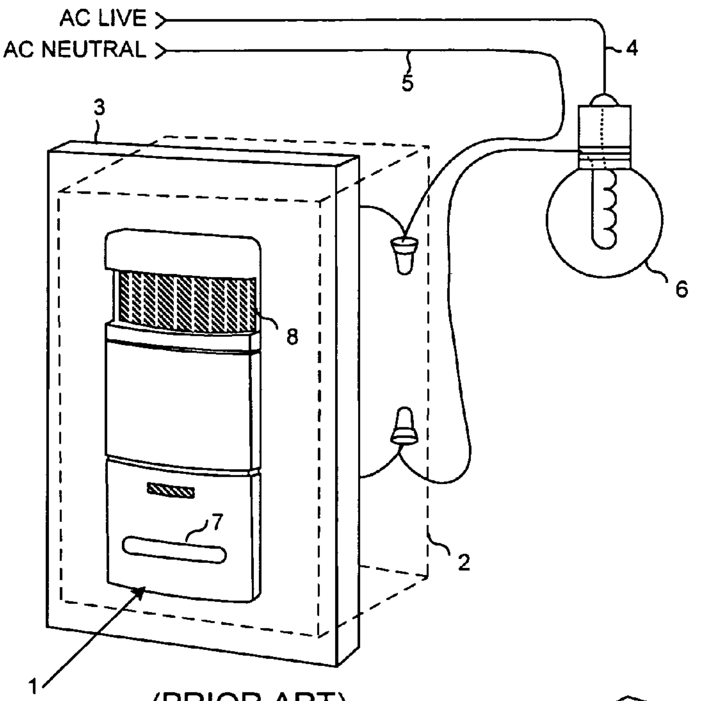
(PRIOR ART) FIG. 1
FIG. 1 (Prior Art) is a simplified perspective diagram of a typical wall switch motion sensor.
Figure 2:
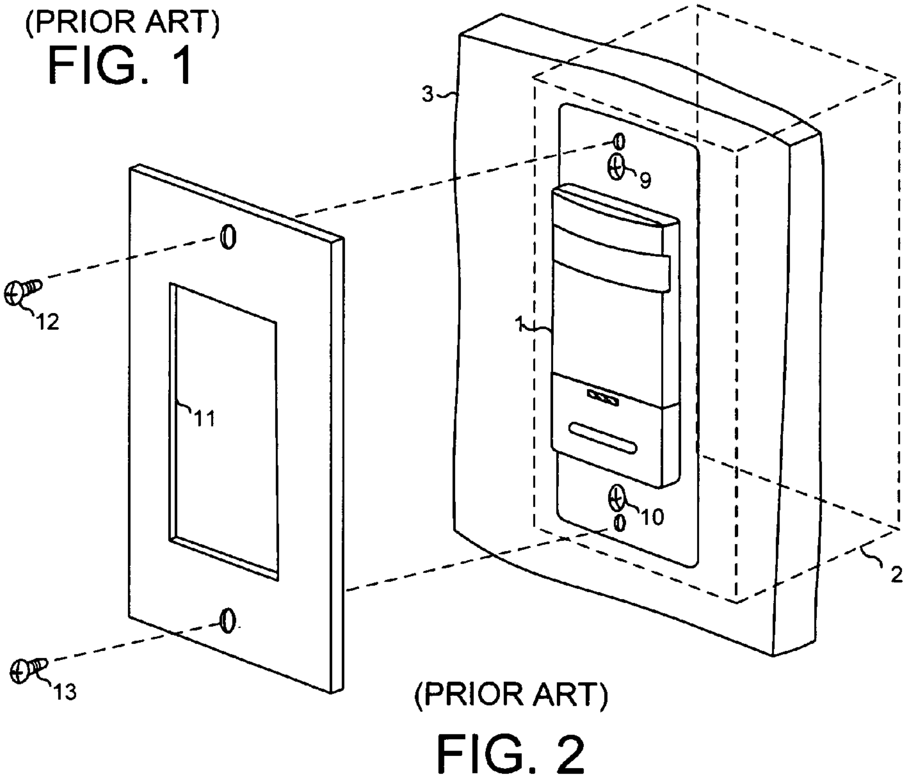
(PRIOR ART) FIG. 2
FIG. 2 (Prior Art) is an exploded view of the wall switch motion sensor of FIG. 1.
Figure 3:
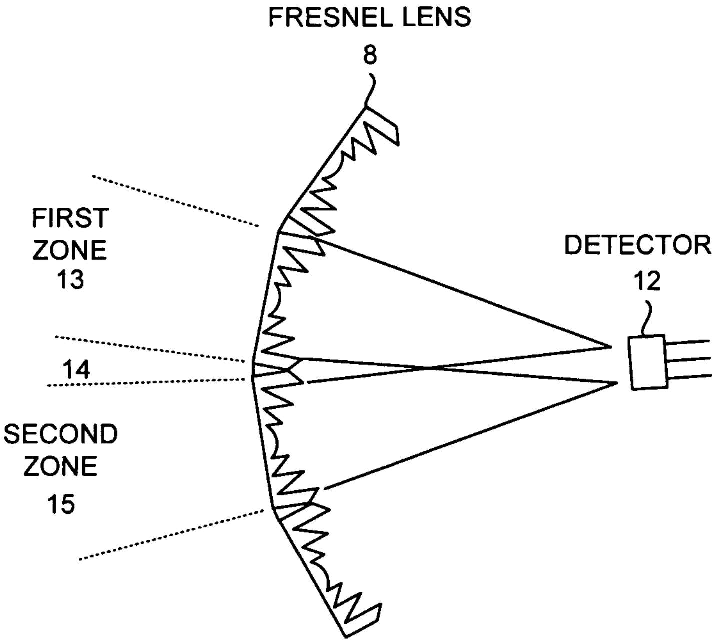
(PRIOR ART) FIG. 3
FIGS. 3 and 4 (Prior Art) are illustrations of how a motion sensor uses a multi-section lens to detect motion.
Figure 4:
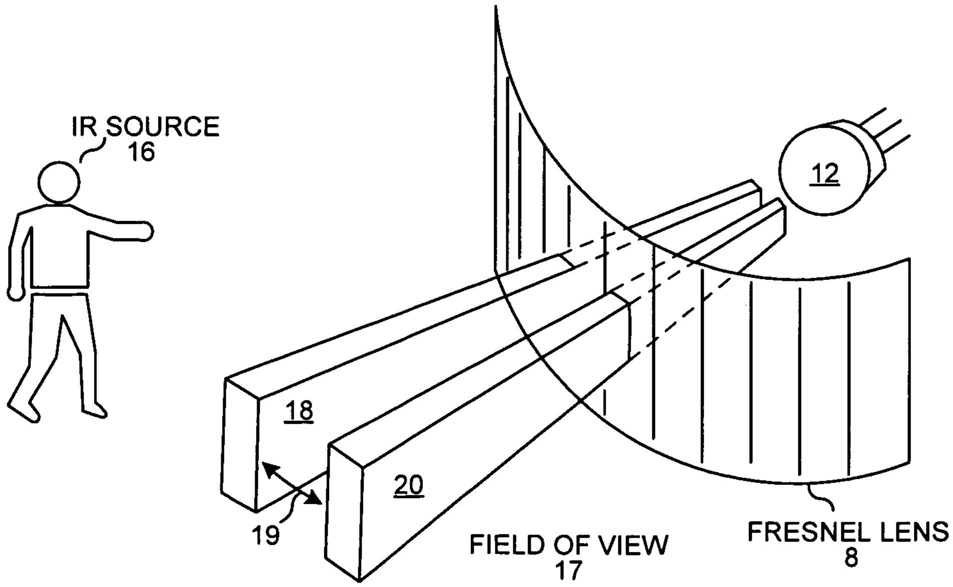
(PRIOR ART) FIG. 4
Figure 5:
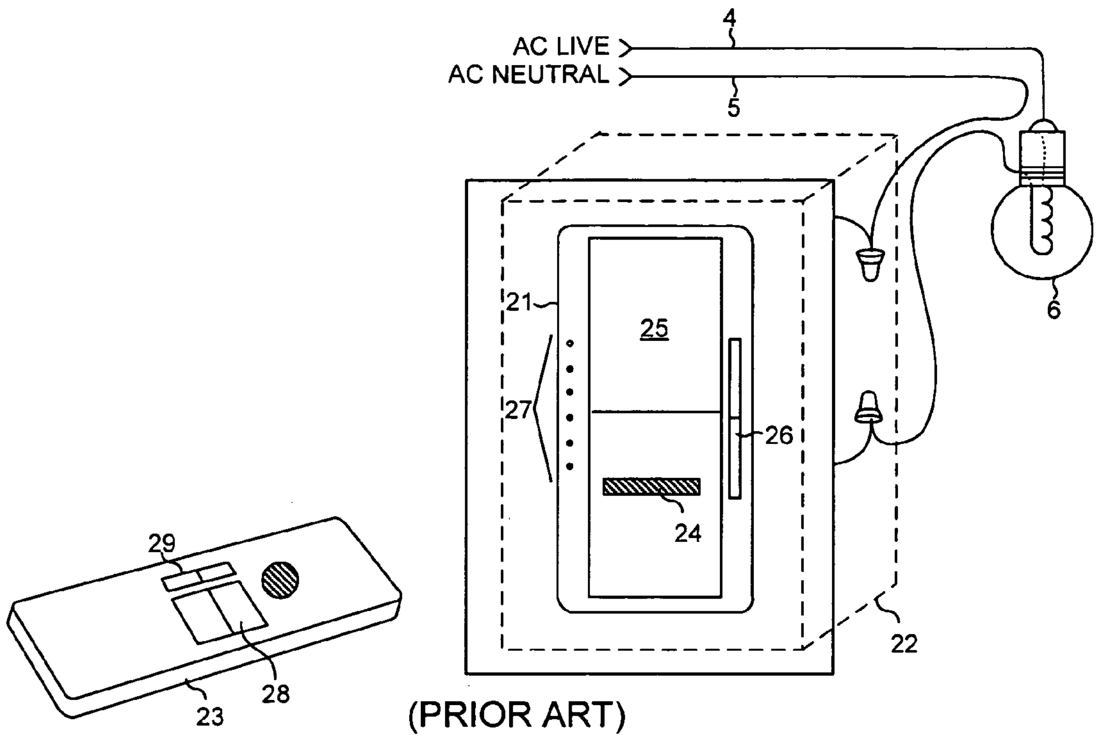
(PRIOR ART) FIG. 5
FIG. 5 (Prior Art) is a perspective diagram of a commercially available prior art wall switch dimmer that can be controlled by a specialized remote control device.
Figure 6:
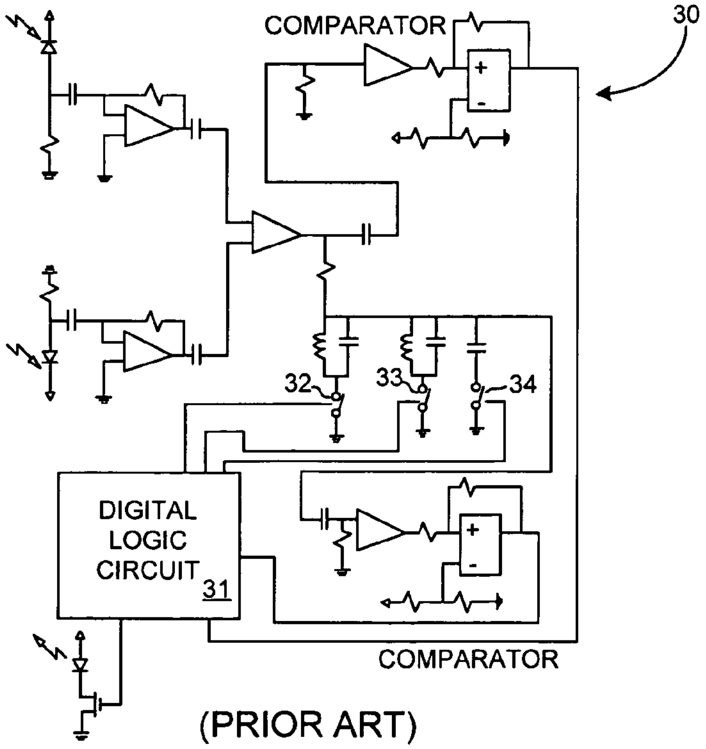
(PRIOR ART) FIG. 6
FIG. 6 (Prior Art) is a circuit diagram of tunable narrowband IR control signal receiver circuit.

In one example of such a use, user 48 enters a room containing the novel wall switch motion sensor 41. Because the user 48 passes through the field of view of multi-section lens 54, and because the user is emitting infrared radiation, the user's motion is detected by wall switch motion sensor 41 as is explained above in regard to FIG. 3 and FIG. 4. Wall switch motion sensor 41 in response to detecting the user's motion closes switch 49, thereby turning on the light 50. The user 48 seats himself on a couch 59. User 48 then presses key 51, thereby causing remote control device 46 to turn on television 47. User 48 may press other keys on the remote control device to change the volume or channel of the television 47. Each of these key presses results in a standard IR control signal being transmitted on a carrier signal to television 47.

The user 48 next wants to dim the light 50 to a level of brightness appropriate for viewing of television 47. User 48 aims remote control device 46 at wall switch motion sensor 41 and performs one or more key presses in an appropriate fashion such that a sequence of separate IR control signals 60, 61 and 53 (or "key transmissions") is transmitted from remote control device 46 and is received by wall switch motion sensor 41 through the multi-section lens 54 and onto a PIR detector. Each of the respective individual IR control signals 60, 61 and 53 in the sequence is separated from the next by a dead time that is more than twenty milliseconds. In one example, the dead time is more than twenty, milliseconds and is less than one second.

The infrared detector circuitry in wall switch motion sensor 41 is optimized for detecting motion. Because the infrared radiation detected from a moving person varies with a low frequency, the infrared detector circuitry is unable to detect and discriminate the higher frequency data bits encoded onto the high frequency carrier signal. Carrier signals used in IR control signals typically have a frequency of greater than ten kilohertz and may, for example, have a frequency of approximately thirty to sixty kilohertz. Nonetheless, the infrared detector circuitry within wall switch motion detector 41 detects a particular pattern of relatively lower frequency increases and decreases in overall average infrared power. During reception of each transmitted IR control signal the average infrared radiation detected is higher. During a dead time the average infrared radiation detected is lower. For example, the user may perform three key presses of any key with such a timing that three IR control signals are transmitted as discrete transmissions. If the timing of these three transmissions is adequately close to a specified timing pattern known to the wall switch motion sensor 41, then the wall switch motion sensor 41 interprets the received sequence as an instruction.

In this example, wall switch motion sensor 41 interprets the sequence of three discrete key transmissions as an instruction from user 48 to dim light 50. In response, wall switch motion sensor 41 begins to dim light 50 at a relatively slow rate from one setting to the next. When user 48 detects the appropriate level of brightness from light 50, the user 48 repeats the sequence of three key presses. Wall switch motion sensor 41 is programmed to interpret the second sequence of three appropriately separated discrete transmissions as an instruction to stop the dimming of light 50. The mechanism for turning light 50 on or off, and for dimming light 50 to various degrees, employs a TRIAC (TRIode for Alternating Current) as is known in the art. A TRIAC dimming circuit is described in more detail in the following diagrams.

In a related embodiment, remote control device 46 is capable of being programmed with a key press macro, as is known in the art. Macro-capable remote control device 46 may be operated such that a single key press by user 48 causes remote control device 46 to transmit a sequence of appropriately timed IR control signals that are spaced from one another by appropriately times dead times. In this manner, user 48 can press a single key on remote control device 46 such that remote control device generates a preprogrammed sequence of discrete IR control signals.

The individual infrared transmissions 60, 61 and 53 should not cause television 47 to perform any noticeable function. Accordingly, in the present embodiment being described, the keycodes of the transmissions 60, 61 and 53 are keycodes that have no meaning to television 47 such that television 47 ignores their receipt. Alternatively, the keycodes could be for alternating and opposite functions such as volume up, volume down, volume up, volume down. Although an example is set forth above in which key transmissions 60, 61 and 53 are of a codeset and protocol that is the same as the codeset and protocol used by television 47, in another example the remote control device 46 is programmed to generate simple blasts of IR radiation that are not proper key transmissions in any IR codeset communication. Alternatively, the transmissions 60, 61 and 53 can be generated in accordance with a codeset, the key transmissions of which are not understood by television 47, but where the codeset used is nonetheless a legitimate codeset that is understood by other electronic consumer devices not in the possession of user 48. These, and other ways of preventing transmissions 60, 61 and 53 from adversely affecting television 47 in undesirable and distracting ways, can be practiced.

Figure 8:
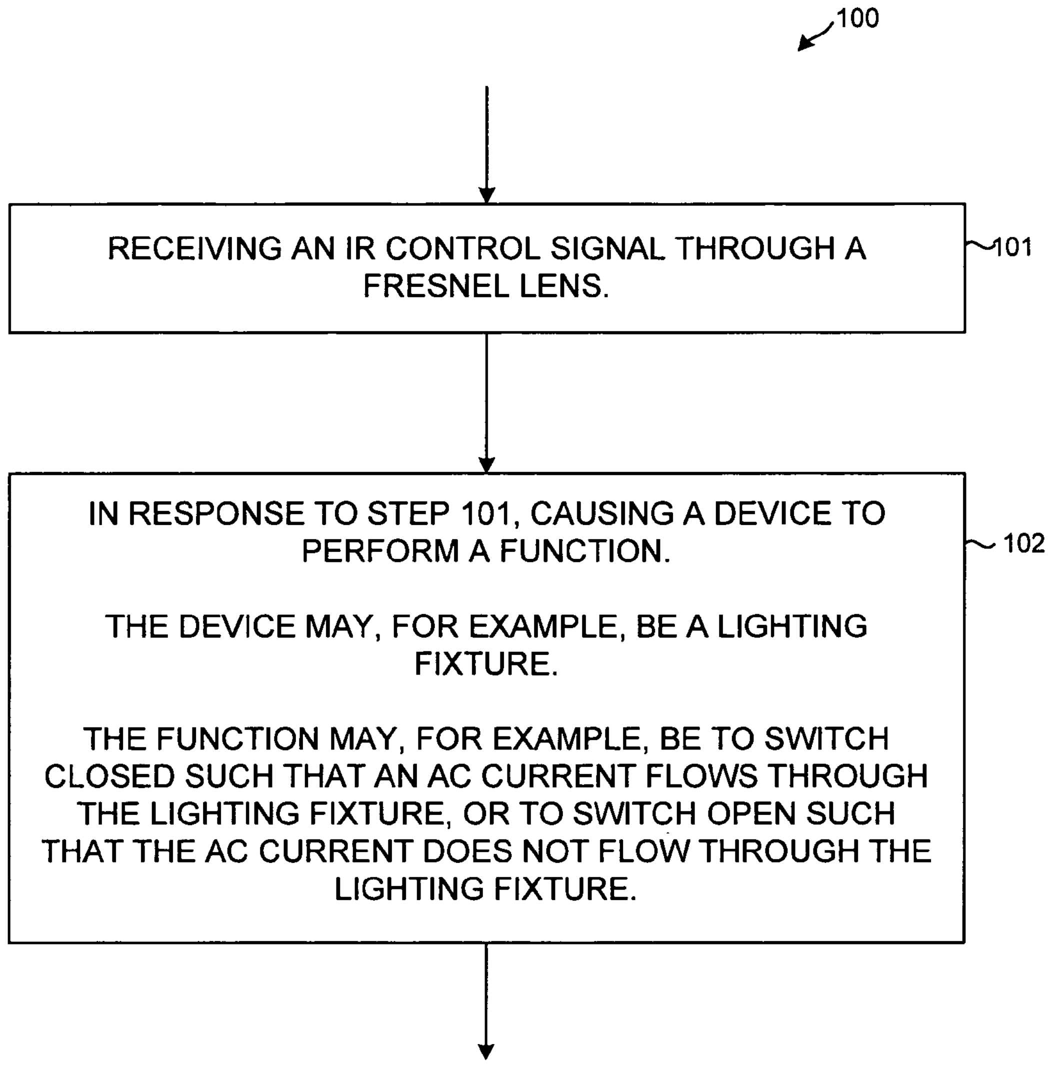
FIG. 8 is a flowchart that illustrates an operation of the wall switch motion sensor of FIG. 7.

FIG. 8 is a flowchart of a novel method 100 in accordance with the system of FIG. 7. In the first step 101, an IR control signal is received through a Fresnel lens. For example, in FIG. 7, the IR control signal is received through Fresnel lens 54 of wall switch motion sensor 41. This IR control signal can either be a single IR control signal transmission (for example, 53) involving a remote control keycode and a remote control system code, or it can involve several IR control signal transmissions (for example, 60, 61 and 53) separated from each other by appropriate dead times.

In a second step 102, in response to the receiving of step 101, a device is caused to perform a desired function. For example, in this case, the device is the switch 49 and the desired function is to close switch 49. Another example of a desired function is to open switch 49. The function can be made to toggle from switch close, to switch open, on alternate receptions of the predetermined IR control signal received in step 101.

Figure 9:
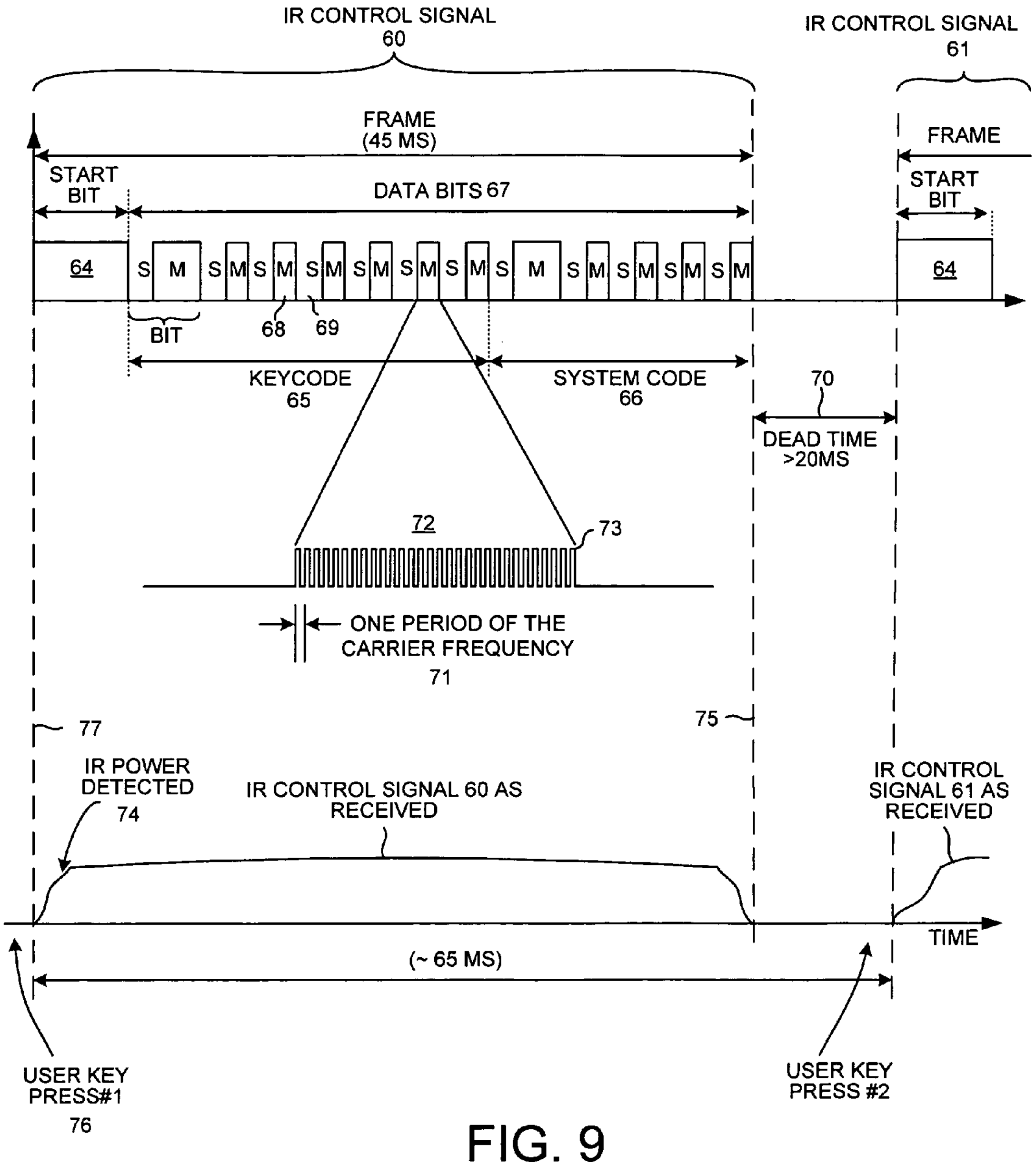
FIG. 9 is a waveform diagram that illustrates how an IR control signal is received by the wall switch motion sensor of FIG. 7.

FIG. 9 is a simplified waveform diagram illustrating one possible example of two consecutive IR control signal IR control signals 60 and 61. In this example, each IR control signal 60 and 61 is a transmission of one or more frames of remote control information. Each frame typically includes a start bit 64, a keycode 65, and a system code 66 in accordance with an IR protocol usable for controlling an electronic consumer device of a particular make and model. The on and off times of the various bits of the bit stream are sometimes referred to in the art as “mark times” and “space times” Reference numeral 68 identifies one mark time. Reference numeral 69 identifies on space time. IR control signal 60 is separated by an appropriate dead time 70 of a given duration (in this example, twenty milliseconds) from IR control signal 61.

The infrared detection circuitry in wall switch motion sensor 41 detects a higher average infrared power during reception of a frame, as opposed to a lower average infrared power during a dead time. The infrared detection circuitry detects timing of IR control signals 60 and 61 with respect to each other so as to determine if IR control signals 60 and 61 are of adequate periodicity to be interpreted as an instruction. One sequence of transmissions can correspond to an instruction to turn on light 50, whereas another sequence of transmissions can correspond to an instruction to turn off the light 50. Other sequences of IR control signal transmissions can be defined to correspond to instructions to start dimming light 50, to start brightening light 50, to stop dimming light 50, and to stop brightening light 50.

Reference numeral 74 indicates the initial detection of infrared power due to the reception of IR control signal 60. IR control signal 60, in this example, occurs in response to a first user key press 76. Vertical dashed line 75 indicates the end of transmission 60, at which point detection of infrared power by wall switch motion sensor 41 drops off. The waveform of average detected power between vertical dashed line 77 and vertical dashed line 75 indicates transmission 60 as detected by the infrared receiver circuitry of wall switch motion sensor 41. Because the infrared receiver circuitry is not a narrowband receiver and is not tuned to carrier frequencies typically used by consumer remote control devices, the detected transmission waveform does not indicate marks and spaces, but rather has a more slowly varying shape.

Figure 10:
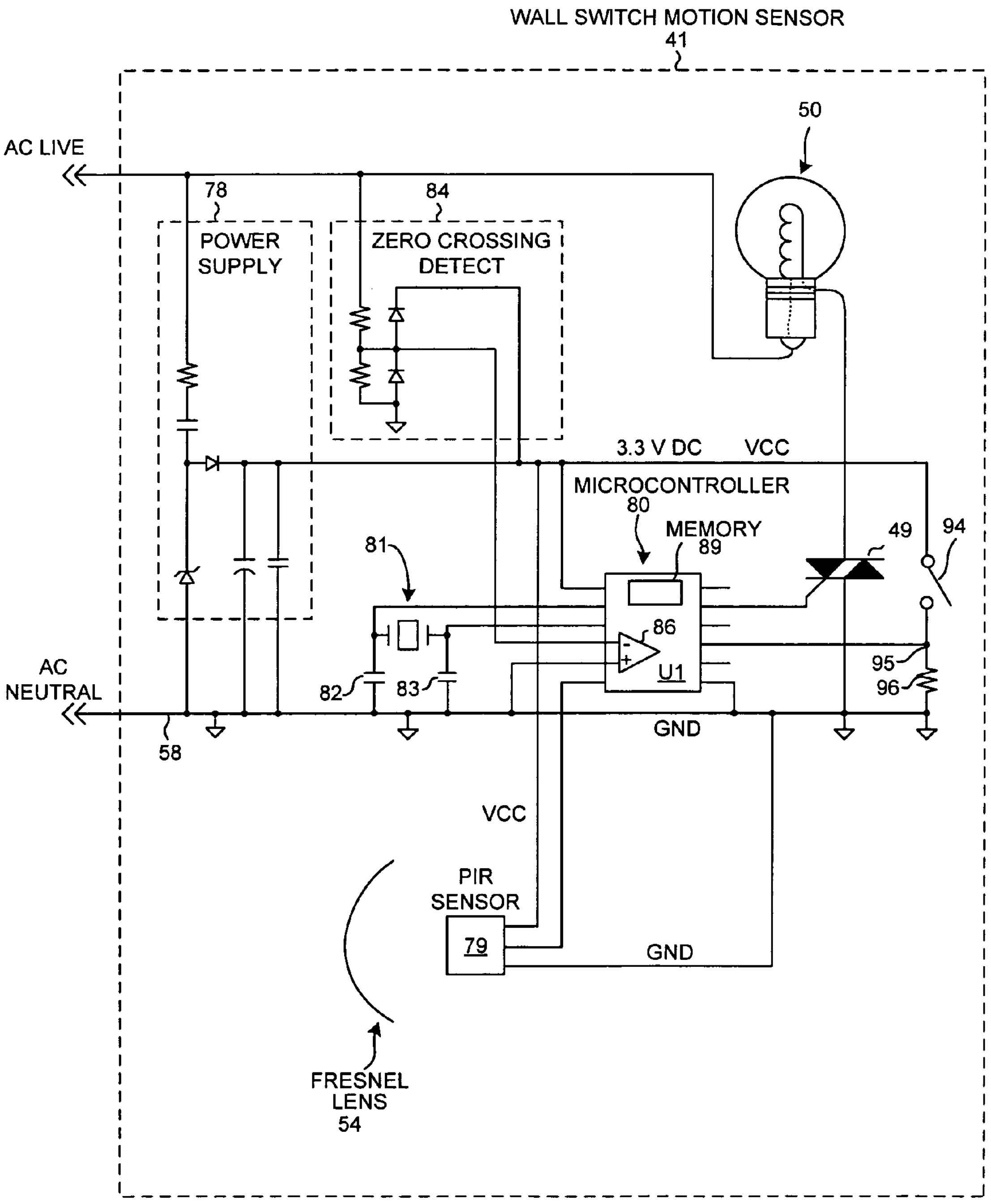
FIG. 10 is a circuit diagram of the wall switch motion sensor of FIG. 7.

FIG. 10 is a circuit diagram of wall switch motion sensor 41 of FIG. 7. Infrared sensor 79 is situated at the focal point of Fresnel lens 54 as is known in the art and described in connection with FIG. 3. A microcontroller integrated circuit 80 includes an amount of memory 89. A crystal 81 and two capacitors 82 and 83 are coupled to an oscillator in microcontroller 80 in standard fashion. The circuit has a simple AC-to-DC power supply 78 that converts 110 volts AC as present between AC Live line 57 and AC Neutral line 58 into a 3.3 volts DC for powering microcontroller 80.

Wall switch motion sensor 41 also involves a zero-crossing detect circuit 84. Zero-crossing detect circuit 84 receives the sixty hertz 110 volt AC signal between AC Live line 57 and AC Neutral line 58, and outputs a relatively lower amplitude version of the AC Live voltage onto an input lead of a comparator 86 within microcontroller 80. The other input lead of comparator 86 is connected to a reference voltage (GND). The comparator 86 therefore detects zero-crossings when the AC Live voltage (110 volts AC) transitions from below the AC Neutral 58 voltage (relative GND) to above the AC Neutral 58 voltage, and when the AC Live voltage transition from above the AC Neutral 58 voltage (relative GND) to below the AC Neutral 58 voltage. Microcontroller 80 can therefore detect when the zero-crossing occurs and can control switch 49 (the TRIAC) to be closed for an appropriate amount of time after a zero-crossing up to 180 degrees of the incoming sixty hertz AC sine-wave, thus controlling the brightness of light 50.

User 48 can also control light 50 by manipulating a manual switch 94 on the face of the wall switch motion sensor 41. If switch 94 is positioned in the open position, then the voltage on node 95 is pulled to ground potential by resistor 96. The low voltage on node 95 is detected as a digital low by microcontroller 80. Microcontroller 80 may be programmed to respond by turning TRIAC 49 off to cut current to light 50. On the other hand, if switch 94 is positioned in the closed position, then the voltage on node 95 is pulled to 3.3 volts. This voltage on node 95 is detected as a digital high by microcontroller 80. Microcontroller 80 may be programmed to respond by turning TRIAC 49 on to allow AC current to pass through light 50 accordingly, thus turning light 50 on. The physical position of switch 94 as set by user 48 is thus detected by microcontroller 80. This allows user 48 to turn light 50 on or off manually.

If user 48 of FIG. 7 performs a sequence of key presses such that the sequence of IR control signals 60, 61 and 53 is generated, then wall switch motion sensor 41 does not detect individual marks and spaces of the transmissions due to their relatively high frequency. Nevertheless, wall switch motion sensor 41 does detect the slower sequence of increases in infrared energy due to the individual IR control signal transmissions separated by the dead times. Microcontroller 80 times these increases and decreases in received IR energy and if the increases and decreases meet a particular predetermined periodicity, then microcontroller 80 determines that the sequence is an instruction to wall switch motion sensor 41. Microcontroller 80 uses zero crossing detect circuit 84 and TRIAC 49 to control the proportion of time that current is allowed to flow through light 50 over the course of a sixty hertz period of the incoming 110 volt AC signal using a TRIAC is known in the art.

Figure 11:
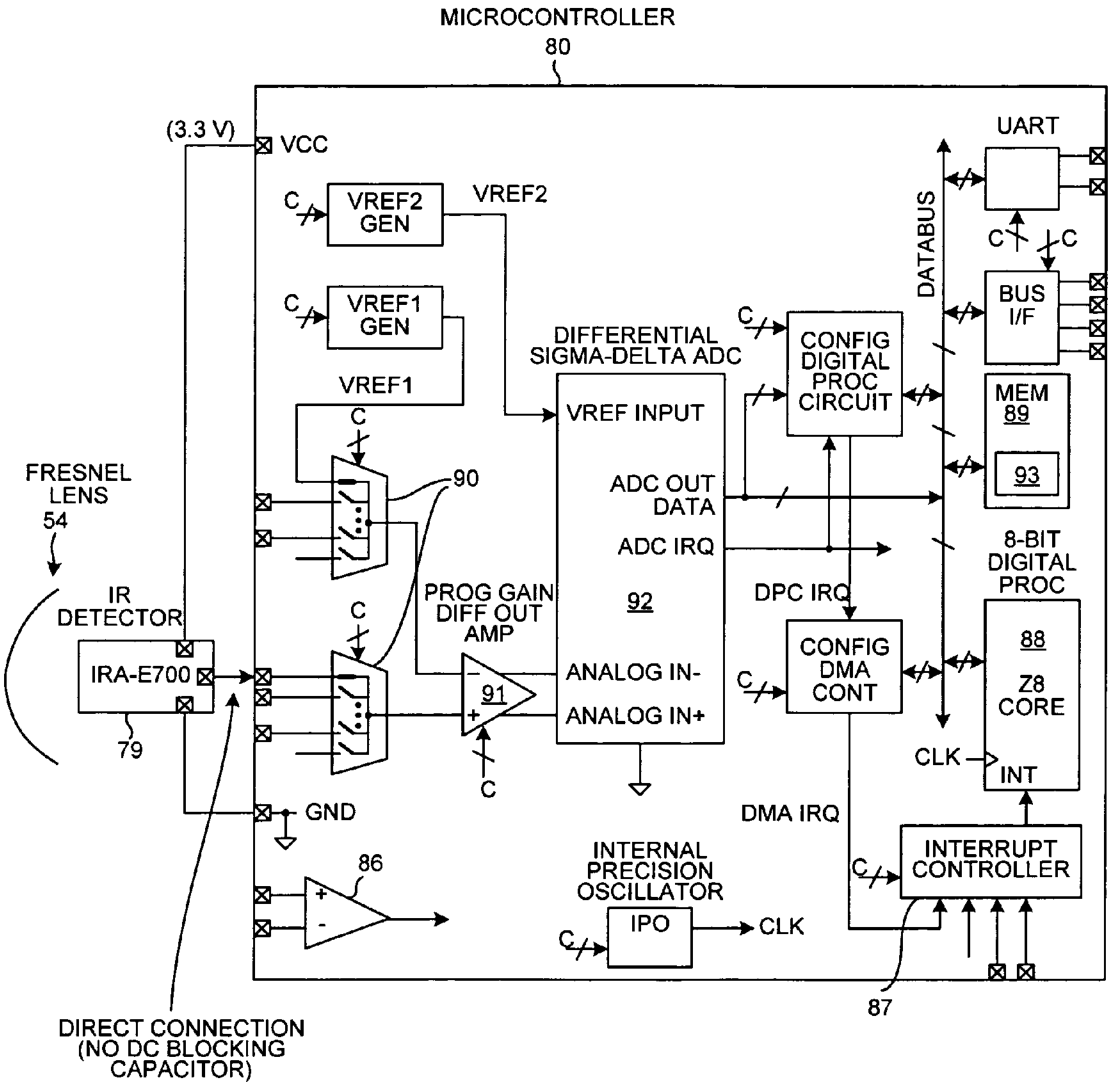
FIG. 11 is a more detailed diagram of the microcontroller in the circuit of FIG. 10.

FIG. 11 is a more detailed diagram of microcontroller 80 of FIG. 10. Microcontroller integrated circuit 80 includes the comparator 86, the memory 89, an interrupt controller 87 and a digital processor core 88. The signal output by comparator 86 is coupled to interrupt controller 87 by a configurable on-chip connection (not shown). When a voltage zero-crossing is detected, a signal output by comparator 86 causes interrupt controller 87 to set an interrupt to processor 88. The processor 88 commences an interrupt service routine, as is known in the art, and determines that a zero-crossing was the cause of the interrupt. Processor 88 then resets the interrupt controller 87. Microcontroller 80 also includes a timer (not shown) that is then used to control the TRIAC 49 of FIG. 9 to open or close for the appropriate amount of time after the zero-crossing as is explained above in regard to FIG. 9.

The FIG. 11 also includes a representation of the Fresnel lens 54 of FIG. 7 and the infrared detector 79 of FIG. 10. In one example, as set forth in additional detail in patent application Ser. No. 12/154,611 entitled "Low-Cost and Noise Insensitive Motion Detector," filed on May 24, 2008, now U.S. Pat. No. 7,675,447 (the contents of which are incorporated herein by reference), the pictured multiplexing circuitry 90 is used in conjunction with programmable gain differential amplifier 91 and differential sigma-delta analog-to-digital converter (ADC) 92 to detect infrared light as received through Fresnel lens 54. Microcontroller 80 detects periodicity of detected infrared radiation as detected by IR detector 79 at a frequency of approximately twenty hertz, and there is no direct current (DC) blocking capacitor in the signal path between detector 79 and microcontroller 80.

In one advantageous aspect, there is little or no additional cost to incorporating into microcontroller 80 the ability to detect the sequence of key transmissions 60, 61 and 53 of FIG. 7. Incorporating the ability to detect and recognize the sequence of IR control signals as an instruction to wall switch motion sensor 41 requires only the addition of an amount of program code 93 into memory 89. The IR control signals of the sequence are received using the same lens and infrared detector and microcontroller as might be used conventional wall switch motion sensors.

In another novel aspect, wall switch motion sensor 41 may include a virtual machine, as described in U.S. Pat. No. 7,286,076, entitled "Generating A Mark/Space Table and A String Of Timing Information On A Remote Control Device," filed on Aug. 27, 2004 (the contents of which are incorporated herein by reference). The virtual machine is a platform that may be used to interpret scripts that are loaded through lens 54 and into memory 89. As is described in U.S. Pat. No. 7,286,076, data may be loaded into the virtual machine platform using a separate electronic device transmitting a relatively low frequency infrared data signal, as pictured in waveforms 60, 61 and 53 of FIG. 7, through the Fresnel lens 54 and into the wall switch motion sensor 41. Microcontroller 80 determines, by the timing of the transmitted data signals, that it is detecting neither motion nor IR control signals 60, 61 and 53, but rather that it is receiving data. Microcontroller 80 consequently converts the infrared data signals into digital information. In one example, the digital information is program code or a script that is loaded into memory 89 and is then executed or interpreted by the virtual machine. In another example, the digital information is data that is processed by the virtual machine or by a script or program on the virtual machine. Information loaded onto a virtual machine in this fashion can, for example, be used to update code on an installed wall switch motion sensor, to install code at the factory, and/or to change sensitivity or other parameters of the wall switch motion sensor. For additional information on loading code and data into the virtual machine, see U.S. Pat. No. 7,286,076.

In one example, an installed wall switch motion sensor includes the ability described above to receive and interpret a sequence of IR control signals as an instruction. In one novel aspect, a user is directed (for example, by a manufacturer or distributor of a remote control device) to program a remote control device to perform a macrofunction such that the remote control device transmits a sequence of infrared (IR) control signals in response to a single key press. The direction to the user can be communicated in writing or advertising on packaging or operational instructions provided to the end user along with a remote control device. The direction can be communicated via the internet. The direction can also be communicated by the manufacturer or distributor of the wall switch motion sensor. The user can make a payment in order to enhance the functionality of the user's installed wall switch motion sensor.

It may be undesirable to control a wall switch motion sensor using key presses which would simultaneously affect the operation of an electronic consumer device. A user may therefore choose to control the wall switch motion sensor via sequences of IR control signals generated by pressing a remote control key which is inoperative or only situationally operative with respect to nearby electronic consumer devices. An example of such a key is the EXIT key. Pressing of the EXIT key would not affect the operation of, for example, a television unless a menu were open. In another novel aspect, a remote control device may detect key presses of such a situationally operative key in a specific sequence and interpret the sequence of key presses as the intent of the user to send a sequence of IR control signals to a wall switch motion sensor. An example of a sequence of such key presses is the pressing of the EXIT key twice within a predetermined amount of time. The remote control device responds by transmitting a properly timed sequence of IR control signals (for example, 60, 61 and 53). The remote control device may transmit the desired sequence with timing provided by the remote control device using a carrier signal frequency. In another novel aspect, the remote control device may respond by transmitting a sequence of transmissions and dead times, where the transmissions do not include information encoded on a carrier signal.

Although certain specific embodiments are described above for instructional purposes, the teachings of this patent document have general applicability and are not limited to the specific embodiments described above. For example, an example has been described in connection with a user pressing a key on a remote control device three times in sequence to transmit an instruction to the wall switch motion sensor. However, this is just one example. Various numbers of key presses separated by various amounts of dead time can be used to signal the wall switch motion sensor to perform a desired function. Further, the desired function is not limited to control of a light; desired functions in other embodiments include other functions such as enabling/disabling/controlling other systems. It is important to note, in the specific working embodiment of FIG. 7, that remote control device 46 transmits IR control signals of the same type and carrier frequency to control both the wall switch motion sensor and the television. Further, the wall switch motion sensor can detect IR control signals of various different carrier signal frequencies transmitted from other remote control devices. A manufacturer of the wall switch sensor need not provide a remote control device that transmits IR control signals that have a particular carrier frequency. The wall switch motion sensor can be programmed to properly detect sequences of IR control signals of all common carrier frequencies. In one advantageous aspect, a wall switch motion sensor that has the remote control functionality includes only one IR detector. The sensor need not employ any one particular type of infrared detector. Although an example is set forth above that involves a wall switch motion sensor, the remote control functionality sees generality applicability to any type of IR motion sensor.

Accordingly, various modifications, adaptations, and combinations of various features of the described embodiments can be practiced without departing from the scope of the invention as set forth in the claims.

What is claimed is:

1. A method comprising:

(a) receiving an infrared (IR) control signal through a multi-section lens, wherein the IR control signal includes a plurality of data bits modulated onto a carrier signal, wherein the carrier signal has a carrier frequency of at least ten kilohertz; and (b) in response to the receiving, causing a first device to perform a first lighting control function without demodulating the data bits, wherein the receiving in (a) and the causing in (b) are performed by a motion detector and lighting control circuit (MDLCC), and wherein the multi-section lens and the first device are parts of the MDLCC.

2. The method of claim 1, wherein the multi-section lens is a Fresnel lens.

3. The method of claim 1, wherein the IR control signal is an IR control signal of a sequence of IR control signals, wherein the IR control signals of the sequence are separated from one another by a dead time of at least twenty milliseconds.

4. The method of claim 1, wherein the IR control signal is a single IR control signal, the single infrared transmission including a frame, the frame including at least one start bit and a keycode, wherein the IR control signal is followed by a dead time of at least twenty milliseconds.

5. The method of claim 1, wherein the MDLCC includes a dimmer functionality.

6. The method of claim 1, further comprising:

(c) controlling a second device to perform a second lighting control function, wherein the second device performs the second lighting control function as a result of the first device performing the first lighting control function, and wherein the second lighting control function is taken from the group consisting of: turning a light on, turning a light off, starting a dimming of a light, stopping a dimming of a light, starting a brightening of a light, stopping a brightening of a light.

7. The method of claim 1, wherein the first device is a switch of a light, and wherein the first lighting control function is taken from the group consisting of: opening the switch, and closing the switch.

8. The method of claim 1, wherein the MDLCC is not tuned to the carrier frequency.

9. The method of claim 1, wherein the plurality of data bits are a keycode, wherein the keycode corresponds to a function of an electronic consumer device, and wherein the keycode does not correspond to the first lighting control function.

10. A device, comprising:

a multi-section lens; and a motion detector and lighting control circuit (MDLCC) that performs a function in response to receiving an (infrared) IR control signal through the multi-section lens, wherein the IR control signal includes a plurality of data bits modulated onto a carrier signal, wherein the MDLCC performs the function without detecting the data bits, and wherein the carrier signal has a carrier frequency of at least ten kilohertz.

11. The device of claim 10, wherein the device is a wall switch motion sensor adapted to be disposed in an electrical wall box.

12. The device of claim 10, wherein the MDLCC includes an infrared detector that receives the IR control signal after the IR control signal has passed through the multi-section lens.

13. The device of claim 10, wherein the function is taken from the group consisting of: turning on a light, turning off a light, dimming a light, brightening a light.

14. The device of claim 13, wherein the device is a wall switch motion sensor, wherein the wall switch motion sensor is adapted to be disposed within an electrical wall box.

15. A device comprising:

a multi-section lens; and means for detecting motion and for receiving an infrared (IR) control signal through the multi-section lens and in response to the receiving performing a function, wherein the IR control signal includes a plurality of data bits modulated onto a carrier signal, and wherein the function is performed without demodulating the data bits.

16. The device of claim 15, wherein the carrier signal has a carrier frequency of at least ten kilohertz.

17. The device of claim 15, wherein the function is taken from the group consisting of: turning a light on, turning a light off, start dimming a light, starting to brighten a light, stopping a brightening of a light.

18. The device of claim 15, wherein the device is a wall switch motion sensor, wherein the wall switch motion sensor is adapted to be disposed within an electrical wall box.

19. A method comprising:

directing a user to use a remote control device such that a sequence of infrared (IR) control signals is transmitted toward a motion sensor, wherein each IR control signal of the sequence includes a plurality of data bits modulated onto a carrier signal, wherein the carrier signal has a carrier frequency of at least ten kilohertz; and providing the motion sensor, wherein the motion sensor is adapted to receive the sequence of IR control signals through a multi-section lens, to determine that the sequence is an instruction, and in response to said determining performing a function without detecting the data bits that are modulated onto any carrier signal.

20. The method of claim 19, wherein said directing involves causing the user to program a macrofunction into the remote control device such that a single key press causes the remote control device to transmit the sequence of IR control signals.

21. A method comprising:

receiving an infrared control signal through a multi-section lens, wherein the infrared control signal includes a plurality of data bits modulated onto a carrier signal, wherein a wall switch motion sensor includes the multi-section lens and a virtual machine, and wherein the wall switch motion sensor converts the infrared control signal into digital information without detecting the data bits of the infrared control signal; and using the digital information in the virtual machine.

22. The method of claim 21, wherein the infrared signal is received onto a pyroelectric sensor after passing through the multi-section lens, and wherein the digital information is taken from the group consisting of: a script to be interpreted by the virtual machine, and data to be processed by the virtual machine.

23. The method of claim 21, wherein the infrared signal is generated by an electronic device.

* * * * *